United States Patent [19]

Vidondo

[11] Patent Number: 4,715,514

[45] Date of Patent: Dec. 29, 1987

[54] AUTOMATIC UNITARY PRODUCT DISPENSING DEVICE

[75] Inventor: Felix G. Vidondo, Peralta, Spain

[73] Assignee: Jofemar, S.A., Peralta, Spain

[21] Appl. No.: 851,141

[22] Filed: Apr. 11, 1986

[30] Foreign Application Priority Data

Apr. 15, 1985 [ES] Spain .................................... 286032

[51] Int. Cl.⁴ ........................ B65H 3/24; B65G 59/06; G07F 11/16

[52] U.S. Cl. .................................... 221/258; 221/262; 221/270; 221/275; 74/109

[58] Field of Search ............... 221/103, 124, 129, 208, 221/245, 258, 262, 268, 270, 272, 274, 275, 276; 74/99 R, 109

[56] References Cited

U.S. PATENT DOCUMENTS

| | | | |
|---|---|---|---|
| 1,151,792 | 8/1915 | Jaeger | 221/275 |
| 2,634,185 | 4/1953 | Wilder | 221/270 X |
| 3,000,539 | 9/1961 | Danziger et al. | 221/129 |
| 3,319,822 | 5/1967 | Ovsienko | 221/270 X |

FOREIGN PATENT DOCUMENTS

| | | | |
|---|---|---|---|
| 543639 | 9/1959 | Belgium | 221/258 |
| 132327 | 6/1902 | Fed. Rep. of Germany | 221/274 |

*Primary Examiner*—Joseph J. Rolla
*Assistant Examiner*—Edward S. Ammeen
*Attorney, Agent, or Firm*—Ladas & Parry

[57] ABSTRACT

A device for automatically dispensing a unitary product has a frame having two grooves therethrough. A coil having a movable core is joined to the frame and one end of one U-shaped flange is joined to one end of the core of the coil for movement therewith. A stud is fixed relative to the frame and cooperative with the one U-shaped flange for guiding its movement. A projection from the one end of the one U-shaped flange joined to the core also butts against the stud, whereby to limit the movement of the one U-shaped flange with the core. A rack on the one U-shaped flange and a pinion rotate a toothed wheel at one end of another U-shaped flange. Two fingers are rotatably connected to the other end of the other U-shaped flange for movement respectively along the grooves upon the rotation of the other U-shaped flange for dispensing the product.

1 Claim, 2 Drawing Figures

AUTOMATIC UNITARY PRODUCT DISPENSING DEVICE

The present invention refers to an automatic unitary-product dispensing device, primarily useful in a coin-operated dispensing machine having a number of columns of products to be dispensed corresponding to the number of dispensing devices incorporated therein.

All the elements constituting the device of the invention are positioned inside a generally rectangular, prismatic-shaped frame open at one, posterior face. The upper face of the frame has two parallel grooves which extend to almost its posterior side and which, at the anterior side, extend a short distance into a closed front face of the frame.

The frame is divided into two, upper and lower compartments by a small plate provided at the centre with a slot. A coil having core which activates the mechanism once corresponding coins have been introduced is housed in the lower compartment. The product-extracting elements which are joined to the core of the coil will be housed in the other compartment.

One, upper end of the core of the coil is joined to one U-shaped flange having a rack between opposite, spaced wings, i.e. legs, defining the U shape of the flange which will mesh with a pinion. The pinion, in turn, meshes with a toothed wheel secured between the wings of another U-shaped flange. The wings of the other flange extend at one end as two side lugs, between which will be housed rotatable puller fingers.

The ends of the wings of the one U-shaped flange are bevelled. At the postero-inferior side of the one flange, where its web joins the core, there is a projection for butting against a stud which prevents it the core and one, joined flange from making a longer ascending, sliding movement and also serves as a guide in their ascending and descending movements which are activated through the core of the coil. The said core of the coil is inside a spring the ends of which butt against the upper surface of the coil and against the one U-shaped flange to which the core is joined.

Figure 1:
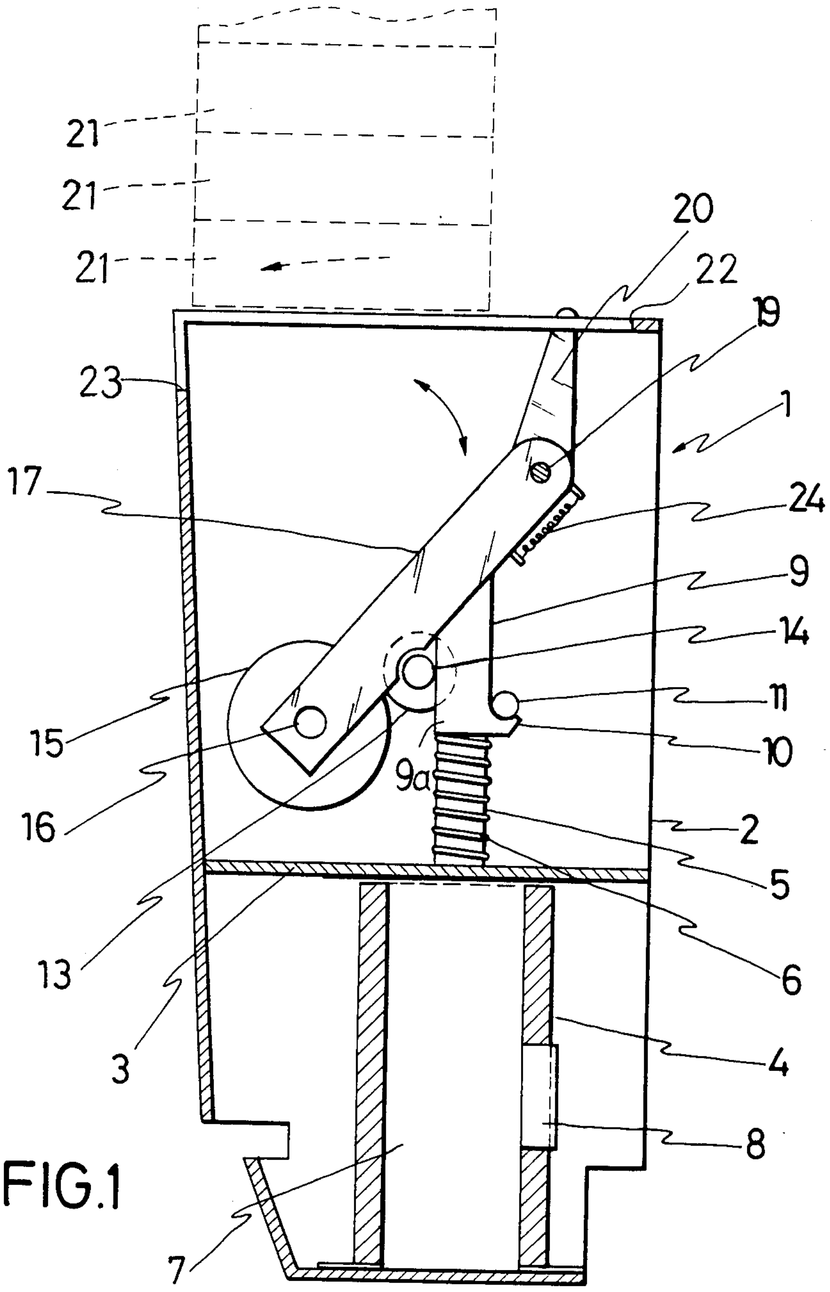
Figure 2:
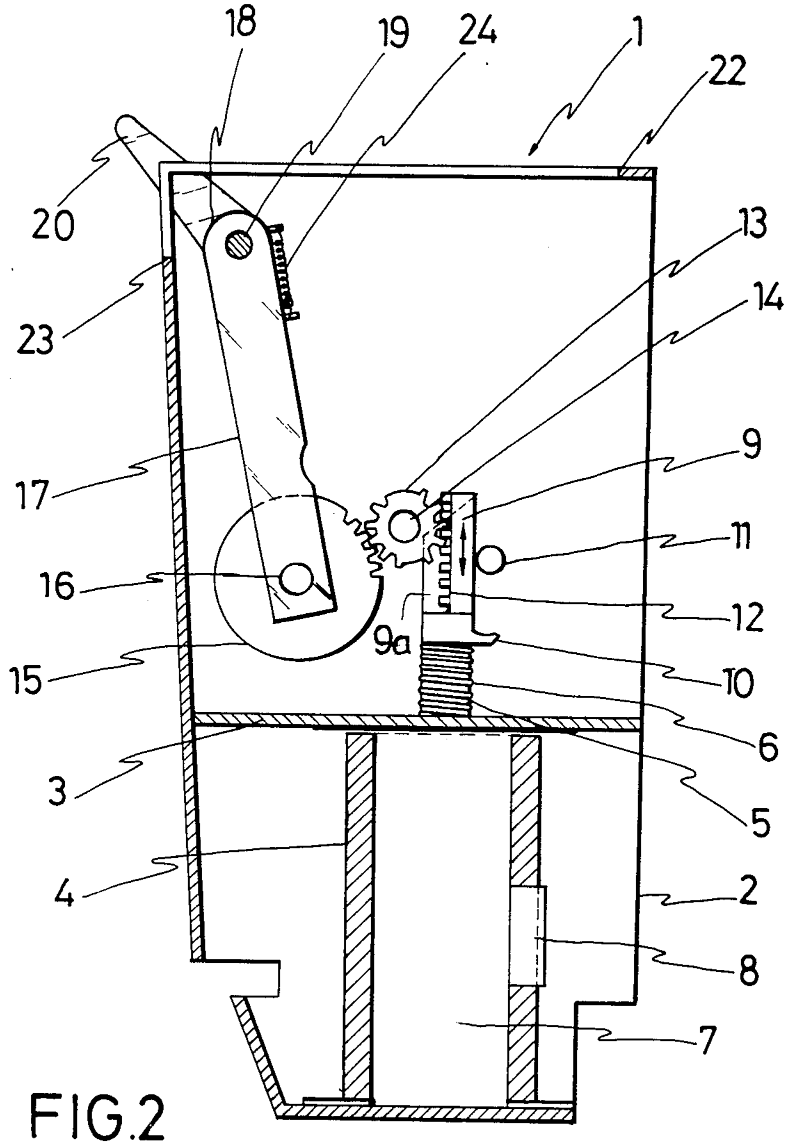

To complete the description to be made and for a better understanding of the characteristics of the invention, a set of drawings accompanies, wherein:

FIG. 1 shows a side elevational view of the device in a preoperation position, partly in section, together with the product to be dispensed positioned on top of the device; and FIG. 2 shows a side elevational view of the device in a post-operation position after the product is discharged, partly in section and partly removed.

Referring to the drawings, there can be seen the product dispensing device 1 which is comprised of a plurality of elements housed in a frame 2 having a generally rectangular, prismatic shape and open at one, posterior face. The frame 2 is divided into two, upper and lower compartments by a small plate 3 provided with a central slot (not shown) which enables the core 5 of a coil 4 and a spring 6 thereabout to pass through the plate.

The coil 4 is positioned in the lower compartment of the frame 2 by a support 7 joined to the frame 2. The support 7 is pressingly held by shoulders 8 which are positioned laterally in the frame 2 to prevent the support 7 from moving.

The elements dispensing the product, upon activation of the core 5 of the coil 4, once the corresponding coins have been introduced, are housed in the upper compartment. One of these elements is a U-shaped flange 9 joined one, bottom side to the end of the core 5. At its postero-inferior part, i.e. bottom-side edge opposite the free ends of its U-shaping wings *9a*, is a projection 10 for butting against a fixed stud 11 fixed relative to the frame to prevent the core 5 from further ascent, i.e. movement away from the coil 4, as shown in FIG. 1 and also to guide the flange 9 in its ascending and descending movement as shown in FIG. 2.

Between the wings of the one U-shaped flange 9, there is a rack 12 (FIG. 2) which meshes with a pinion 13 rotating with a shaft 14; the said pinion 13 likewise meshes with a toothed wheel 15 rotating with a shaft 16.

The toothed wheel 15 is secured to another U-shaped flange 17 at one end of the other flange 17, whereas the opposite end of the other flange extends laterally into two lugs 18 (only one shown) between which there is a tubular body (not shown) which can rotate with a shaft 19, also between the lugs, from which two fingers 20 (only one shown) extend. The fingers will dispense the product 21 placed on top of the frame 2.

The upper face of the frame 2 has two grooves (only one shown) extending from the point 22 to the point 23 positioned at the front face, and along which the fingers 20 slide.

Once the product 21 has been discharged by the fingers 20, the remaining products drop and are supported again on the frame 2 so that the fingers ought to turn for the flange 17 return from the position of FIG. 2 to that of FIG. 1. After this, the spring 24 causes them to return to their original position. The spring 24 is between the flange 17 and the fingers 20. The tubular body which rotates with the fingers 20, has a projection which butts against the web of the flange 17 and prevents it from further turning, due to the action of the spring 24.

In the pre-operation position, a part of the pinion 13 and of the upper end of the rack 12 will be encountered between the wings of the flange 17.

Thus, when the suitable coins have been introduced, the core 5 is activated causing the U-shaped flange 9 and the rack 12 to descend, whereby the pinion 13 and the toothed wheel 15 will turn, which turn will cause the flange 17 to turn, so that the fingers 20 will discharge the product 21. Then, once the product has been dispensed, the elements will return to their pre-operation position and are ready for a new operation.

I claim:

1. An automatic unitary-product dispensing device, comprising:
   - a frame having two grooves therethrough;
   - a coil having a movable core, the coil being joined to the frame;
   - one U-shaped flange joined at one end to one end of the core of the coil for movement therewith;
   - a stud fixed relative to the frame and cooperative with the one U-shaped flange for guiding the movement thereof with the core;
   - a projection at the one end of the one U-shaped flange joined to the one end of the core but butting against the stud, whereby to prevent further movement of the one U-shaped flange with the core;
   - a rack in the one U-shaped flange for movement therewith;
   - a pinion meshed with the rack for rotation upon the movement of the rack with the one U-shaped flange;
   - a toothed wheel meshed with the pinion for rotation thereby;

another U-shaped flange secured to the toothed wheel at one end for rotation therewith and extending into two lugs at the opposite end;

rotatable means positioned between the lugs for rotation therebetween;

two fingers connected to the rotatable means for rotation therewith and movement respectively along the grooves upon the rotation of the another U-shaped flange, whereby said fingers engage a product to dispense the product.

* * * * *